United States Patent

[11] 3,601,174

[72] Inventors Daniel B. Shotwell
    Washington;
    James C. Barton, Peoria, both of, Ill.
[21] Appl. No. 856,617
[22] Filed Sept. 10, 1969
[45] Patented Aug. 24, 1971
[73] Assignee Caterpillar Tractor Co.
    Peoria, Ill.

[54] MEANS FOR DAMPING BOUNCE IN VEHICLE TIRES
10 Claims, 4 Drawing Figs.
[52] U.S. Cl. .................................................. 152/331,
    152/8, 152/DIG. 5
[51] Int. Cl. ............................................. B60c 5/00
[50] Field of Search ........................................ 152/330–342,
    331, 8; 267/114

[56] References Cited
UNITED STATES PATENTS
497,965   5/1893   Owen .................... 152/330 W
1,332,953 3/1920   Richards ................. 152/336
2,730,354 1/1956   Burris .................... 267/114
2,690,779 10/1954  Rust ...................... 152/10

Primary Examiner—Arthur L. La Point
Assistant Examiner—Richard A. Bertsch
Attorney—Fryer, Tjensvold, Feix, Phillips & Lempio ABSTRACT: A vehicle tire is inflated with water and is associated with one or more hollow vessels of rigid construction each containing a compartment for a gas such as air, the compartment having at least one flexible wall. The vessels have ports which admit water when the tire is compressed as in bouncing or riding over an object in the road. Some of the ports may be valved to prevent escape of water so expansion of the air, after it has been compressed by deformation of the flexible wall when the water enters the vessel, is retarded and the normal bounce of the tire is damped.

PATENTED AUG 24 1971
3,601,174
SHEET 1 OF 2
Fig-1-
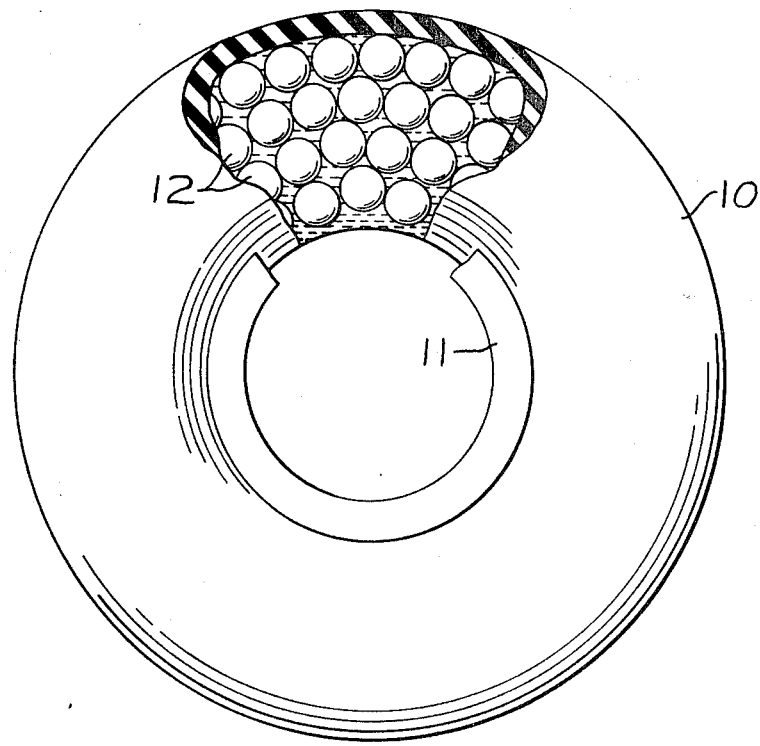
Fig-2-
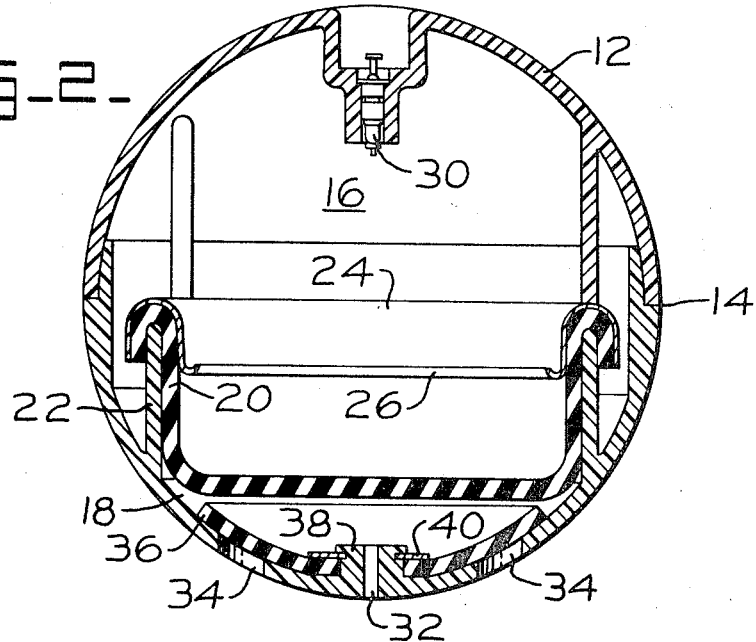
INVENTORS
DANIEL B. SHOTWELL
JAMES C. BARTON
BY
Fryer, Tjensvold, Feix, Phillips & Lempio
ATTORNEYS PATENTED AUG 24 1971
3,601,174
SHEET 2 OF 2
Fig-3-
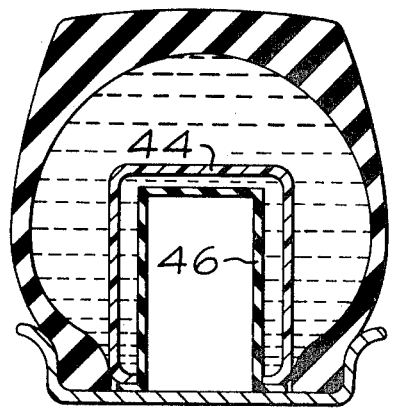
Fig-4-
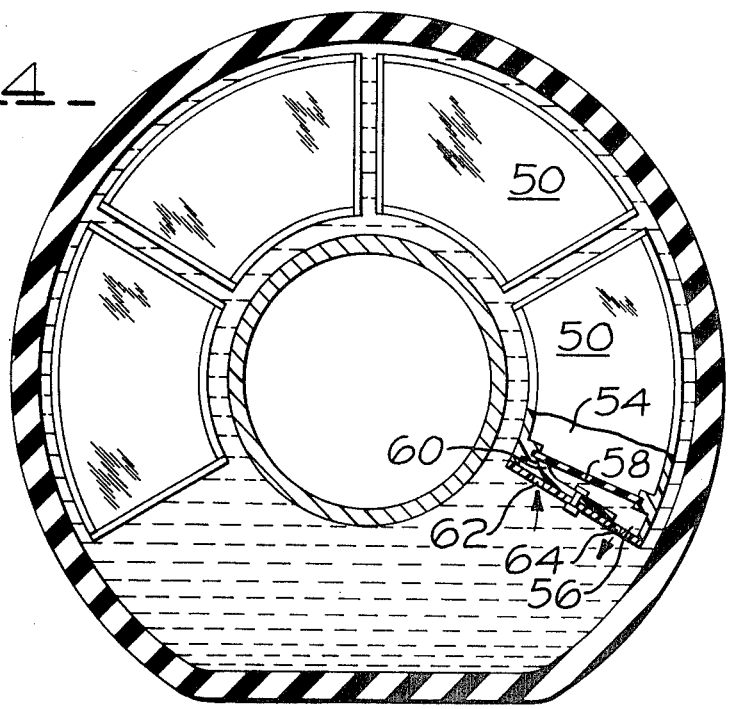
INVENTORS
DANIEL B. SHOTWELL
JAMES C. BARTON
BY
Fryer, Tjensvold, Feix, Phillips & Lempio
ATTORNEYS

MEANS FOR DAMPING BOUNCE IN VEHICLE TIRES

In many cases, rubber-tired earthmoving machines are resiliently suspended by the tires only. Often tires are sufficiently soft to provide adequate shock isolation but this conventional damping by tires alone does not provide acceptable control of vehicle bounce.

Several systems of controlling vehicle bounce have been provided but are all expensive and complex. Ideally, the tires themselves should be made to act as dampers but attempts to do this have proven unsuccessful. In accordance with the present invention, the tire becomes what is in effect a liquid-over-air spring.

The invention is described in greater detail and with reference to different embodiments thereof in the following specification wherein reference is made to the accompanying drawings.

In the drawings:

FIG. 1 is a partially sectioned, schematic view in side elevation of a tire embodying one form of the present invention;

FIG. 2 is an enlarged central sectional view of one of many tire-damping vessels contained in the tire shown in FIG. 1;

FIG. 3 is a transverse section through a tire illustrating a modification of the invention in which a single vessel is employed; and FIG. 4 is a central vertical section through a tire of the present invention showing another modification of the vessels which are employed within the tire.

The tire schematically illustrated in FIG. 1 is shown at 10 as being of the tubeless type and mounted on a rim 11. The tire is inflated with a liquid which is preferably water and contains a plurality of spherical vessels 12. The vessels are of rigid material which may be plastic and contain sufficient air to cause them to float and maintain positions adjacent the top of the tire even during rotation of the tire in use. The vessels are less than sufficient in number to completely fill the area within the tire so that they float upwardly and away from the portion of the tire in contact with the ground. Consequently, they are not crushed as the tire is normally deformed at its area of contact with the ground.

A typical one of the vessels shown at 12 is illustrated in FIG. 2 as being formed of separable halves joined as by a suitable plastic adhesive at a joint 14. The vessel is divided into two compartments, one shown at 16 for a gas such as air and the other at 18 for water. These compartments are separated by a flexible diaphragm 20 clamped to an annular wall 22 within the vessel by means of a ring 24 which is preferably of deformable metal capable of being pressed into clamping contact with the diaphragm. The lower inner edge of the wall is flanged upwardly as at 26 to provide a curved surface which will prevent cutting or chafing of the diaphragm as it is deformed upwardly.

In use, the vessels 12 are inflated with air through a suitable inlet valve represented at 30 and the liquid compartment 18 will contain water at the same pressure as that with which the tire is filled. The liquid compartment 18 is in communication with the main body of liquid in the tire by means of an orifice shown at 32. Other and larger orifices, which may be several in number, are illustrated at 34 and they are normally closed by a flap valve of rubber or other resilient material shown at 36 as anchored to a post 38 within the vessel as by a simple ring 40.

In preparation for use, the vessels 12 are charged with air at a pressure, for example, of 40 p.s.i. The tire is then assembled on its rim with the vessels in place and charged with water through a suitable valve and valve stem (not shown) to a somewhat greater pressure as, for example, 45 p.s.i. This pressure enters the compartments 18 of the vessels compressing the air somewhat and urging the diaphragm 20 approximately to the position illustrated in FIG. 2. The pressures given are, of course, only examples and may vary greatly for tires of different sizes and variations in operating conditions.

When a vehicle, equipped with tires assembled in the manner described above, is in operation and encounters uneven terrain such as a rise or depression, deformation of the tire occurs and momentary increase of internal pressure causes water to enter the compartment 18 through the valved orifices 34 with resulting deformation of the diaphragm 20 and compression of the air in compartment 16. The return to normal of the tire is slowed or damped by virtue of the fact that the valve 36 of each vessel acts as a check valve delaying expansion of the air compressed in the chamber 16 because expulsion of the added water in chamber 18 must take place through the restricted orifice 32.

Modifications of the invention described above are shown in FIG. 3 and FIG. 4. In FIG. 3 a single annular rigid vessel is illustrated at 44 as disposed within the tire and having an outside diameter sufficiently less than that of the tire to prevent its being damaged when the tire encounters uneven terrain. A flexible annular container 46 within the vessel 44 provides an air compartment. It is anticipated that the arrangement disclosed, and particularly the hard outer vessel 44, would be made in several parts to permit its assembly into the tire. Such details as orifices, valves, and stems for inflation may be varied and are not illustrated in this modification. For example, a hereinafter-described flap valve 60 and orifices 62 and 64 (FIG. 4) may be associated with vessel 44 to provide the dampening function.

FIG. 4 shows a further modification in which separate arcuate vessels 50 are arranged to float in the water within the tire and are so limited in number and size that ample space for distortion of the tire is provided in its road-engaging area. In this modification, each vessel is divided into an air chamber 54 and a water chamber 56 by a flexible diaphragm 58. A flap valve illustrated at 60 will admit water through large orifices 62 while the water must be expressed through a smaller orifice or orifices 64. The configuration may be preferred over that of FIG. 1 because of the lesser number of vessels which must be present in each tire and may be preferred over FIG. 3 because of the relative ease of assembly of the vessels into the tire.

While the disclosure so far has related to orifices, some of which are valved, between the air and liquid compartments, it is contemplated that in some applications valves may be omitted. For example, the size of the restricted orifices which control flow of liquid into the air chamber could be such as to control its flow out of the air chamber at just the rate to produce the desired damping effect. The expression "air chamber," as used herein, will be understood as a chamber with more or less rigid walls but having a diaphragm of flexible material separating it into a compartment for air and a compartment with which liquid may enter to compress the air.

What is claimed is:

1. Means for damping bounce in an inflatable tire for a vehicle wheel comprising at least one rigid vessel, having a chamber defined therein, disposed within the tire, a flexible member secured to said vessel to divide the chamber thereof into a gas chamber for containing a gas under pressure and a liquid chamber for containing a liquid under pressure, a body of liquid under pressure within the tire, said vessel having port means formed therein for communicating said liquid under pressure from said body of liquid to said liquid chamber at a substantially unrestricted flow rate, check valve means normally closing said port means for preventing liquid from escaping from said liquid chamber to said body of liquid and means for constantly permitting liquid to escape from said liquid chamber to said body of liquid at a restricted flow rate.

2. The means for damping bounce in a tire as set forth in claim 1 in which a plurality of said rigid vessels are employed and are free to float in the body of liquid in the tire whereby they are suspended above the lower portion of the tire where it is distorted by engagement with the earth.

3. The means for damping bounce in a tire as set forth in claim 2 in which the vessels are of spherical contour.

4. The means for damping bounce in a tire as set forth in claim 2 in which the vessels are of arcuate contour and are suspended by flotation in the upper portion of the tire.

5. The means for damping bounce as set forth in claim 1 in which the said rigid vessel is of annular configuration and extends throughout the circumference of the interior of the tire and in which its diameter is considerably less than that of the tire to permit tire deformation where the tire contacts the ground.

6. The means for damping bounce as set forth in claim 1 in which the check valve means is a flap valve of resilient material.

7. The invention of claim 1 wherein the pressure of said body of liquid is greater than the pressure of said gas.

8. The invention of claim 1 wherein said last-mentioned means comprises orifice means formed in said vessel.

9. A tire defining a closed, annular chamber therein, a pressurized liquid contained in said annular chamber, and at least one hollow, rigid vessel, disposed within said annular chamber, comprising a flexible member secured therein to define a gas chamber containing a pressurized gas therein and a separated liquid chamber and means for selectively communicating liquid from said annular chamber to said liquid chamber at a substantially unrestricted flow rate and for communicating liquid from said liquid chamber to said annular chamber at a restricted flow rate.

10. The invention of claim 9 wherein the pressure of said liquid is greater than the pressure of said gas.